Nov. 7, 1961     C. F. CLINE     3,007,805
CARBIDE-BONDED GRAPHITE BODIES AND METHOD OF MAKING THE SAME
Filed Aug. 22, 1957
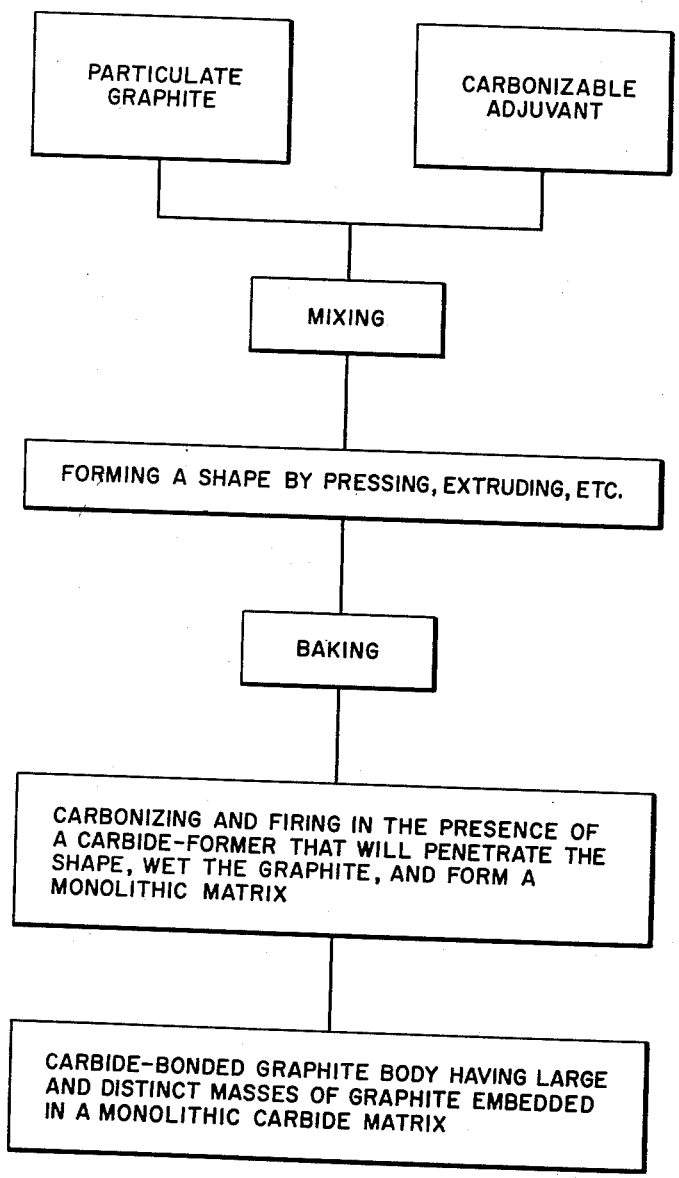
INVENTOR.
CARL F. CLINE
BY
ATTORNEY

United States Patent Office 3,007,805
Patented Nov. 7, 1961

3,007,805
CARBIDE-BONDED GRAPHITE BODIES AND METHOD OF MAKING THE SAME
Carl F. Cline, Grand Island, N.Y., assignor to The Carborundum Company, Niagara Falls, N.Y., a corporation of Delaware
Filed Aug. 22, 1957, Ser. No. 679,573
5 Claims. (Cl. 106—44)

This invention relates to carbide-bonded graphitic bodies, and to methods for making these bodies.

Graphite is being used as a material to form bodies that are used in the high temperature areas in rockets, ram jets, turbines and the like, where the refractoriness, high strength, erosion resistance, and machinability of graphite are desirable. Graphite also has excellent thermal properties.

However, at the present time, high temperature applications for graphite are limited to those of short duration, or those in which the material encounters a reducing or a neutral atmosphere. In an atmosphere of air, serious oxidation of graphite begins to occur at temperatures in the range of 450° C. to 500° C.; in a steam atmosphere, at about 700° C.; and in an atmosphere of carbon dioxide, at about 900° C. These critical temperatures are conveniently referred to as threshold oxidation temperatures.

Several methods of raising these threshold oxidation temperatures have been investigated. For example, pieces formed from graphite have been impregnated with oxidation retardants, such as, for example, sodium tungstate; or have been plated with refractory metal; or coated with a glaze or refractory material. None of these previous methods has ever been successful in producing a graphite body that would resist oxidation for long periods at temperatures over 1000° C. to 1500° C. Extensive high temperature applications are readily available for any graphite body that is resistant to oxidation, particularly over long periods of time.

Silicon carbide bodies have excellent oxidation resistance, but silicon carbide is inferior to graphite in thermal stability at elevated temperatures and is limited in its high temperature applications to those temperatures that are below the dissociation temperature of silicon carbide.

One object of the present invention is to provide a composite graphitic body that is characterized by superior resistance to oxidation and erosion.

Another object of the invention is to provide a composite graphitic body that is characterized by superior strength characteristics.

Still another object of the invention is to provide a graphitic body that is characterized by enhanced resistance to oxidation, erosion, and thermal shock at extremely high temperatures, and that is easily fabricated.

A further object of the invention is to provide satisfactory manufacturing processes for making graphitic bodies of the character described. More specifically, it is an object of the invention to provide techniques for bonding graphite with carbide.

At the present time, bodies that are made from formed graphite are prepared by mixing a graphitizable carbon, such as petroleum coke, with tar or pitch binders; extruding or molding the mixture to shape under pressure; and then firing the shape at temperatures in the neighborhood of 2600° C. in resistance furnaces. As the shape is fired, the binder volatilizes, at least partially. When the binder volatilizes, pores are formed in the body. The porosity of a graphite body can be regulated by adjustment of the processing conditions, but at the present time, porosity cannot be eliminated completely. Consequently, graphite bodies that are now available are characterized by a porous macrostructure. This porous macrostructure permits the rapid diffusion of oxygen to the interior of the body, and because of this, graphite bodies are characterized by relatively poor resistance to oxidation at high temperatures.

According to the present invention, superior carbide-bonded bodies are obtained that consist essentially of relatively large and distinct graphitic masses that are embedded in a well crystallized carbide matrix. The carbide matrix is generated in situ within a preformed graphitic body by introducing a carbide-former at carbide-forming temperatures. The carbide-formers that may be used include: hafnium, zirconium, titanium, vanadium, niobium, tantalum, chromium, molybdenum, tungsten, thorium, and uranium, which may be referred to as the refractory hard metals; boron; and silicon. Mixtures of these carbide-formers may also be used in order to obtain bodies that have special characteristics. In addition, substances that release these carbide-formers, or mixtures of them, upon firing, can be used. All of the carbides of these substances will improve the abrasion and erosion resistance, strength, and hardness, of graphitic bodies. However, silicon is preferred for use as the carbide-former because silicon carbide has superior oxidation resistance.

Surface study of a silicon carbide-bonded graphitic body reveals an excellently articulated and continuous network of relatively well crystallized silicon carbide, that forms the matrix in which graphitic masses are embedded. The carbide matrix imparts strength to the body, and encapsulates the graphitic masses, to bond them together and to protect them against oxidation. The carbide matrix also imparts to the body increased abrasion and erosion resistance. The graphitic masses impart to the body highly desirable characteristics of thermal stability.

Silicon carbide-bonded graphitic bodies have excellent characteristics of strength, refractoriness, and erosion resistance. They have high resistance to oxidation and are much superior in this respect to graphite. They also have excellent thermal stability and are superior in this respect to some silicon carbide bodies. They are particularly well adapted for use in forming hot casting molds, susceptors for induction furnaces, and certain components of rockets, ram jets, turbines, and are generally useful in any other place where graphite is now employed and where improved strength or resistance to corrosion or erosion is desired.

Graphitic bodies that are formed with the other carbide bonds also have excellent characteristics of strength, refractoriness, and erosion resistance, but have less desirable oxidation resistance than silicon carbide bonded graphitic bodies.

These superior carbide-bonded bodies can be produced by a relatively simple process. In this process, a mixture is made of a graphitic mass and of a fugitive or carbonizable forming adjuvant that may function as a bond, as a plasticizer, or simply as a modifier that will assist in pressing, extruding, or the like. A preferred adjuvant is a thermosetting synthetic resin that will function as a temporary binder. This mixture is formed into a shape and the shape is baked to cure the resin. The shape is then fired in a neutral or reducing atmosphere, in the presence of elemental silicon, or other suitable carbide-forming element or mixture of such elements, and at a sufficiently high temperature so that the silicon or other carbide-former penetrates the shape and reacts with fine carbon and graphite particles in the shape to form carbide in situ. When the shape is fired, the thermosetting resin is carbonized, and during siliconization, the carbide-former reacts with the carbon from the carbonized resin, and with the finer particles of carbon or graphite in the shape.

The general steps involved in the practice of one preferred embodiment of the process of this invention are shown in outline form in the drawing that accompanies this description of the invention.

The raw materials, from which the carbide-bonded graphitic bodies of this invention are made, include particulate graphite, or graphitic material, and a carbonizable adjuvant that are mixed together to form a shape, and a carbide-former.

In selecting the particulate graphitic material to be used in the process, care must be exercised to select a material that includes a minimum amount of fine particles that will react with silicon or other carbide-former during firing, to form a part of the silicon carbide or other carbide bond. This minimum amount of fines appears to be on the order of about 20% by weight, based on the total weight of particulate graphitic material that is employed.

The preferred graphitic material is a pure grade of graphite, but other hard, graphitic types of carbon may be used, such as anthracite.

Fine particulate material, or flour, is considered to be, for the purposes of this description, particulate material that has a distribution of approximately 99% through a 200 mesh Tyler standard screen; that is, when "fine" graphite is referred to herein, a particle size on the order of 74 microns or less is meant, and "coarse" graphite refers to larger particle sizes. While the size of the "coarse" particles should be controlled so that good carbide formation occurs, a preferred size range of coarse particles is between about 200 microns and below about 2.4 mm. In the following detailed description of the invention, there will be described mixtures of particles of graphite of different sizes, that have been siliconized to form bonded graphite bodies, and the description will show the effects on the properties of the bodies of different proportions of fine graphite particles in the mixtures.

The carbonizable adjuvant is preferably, but not necessarily, a thermosetting resin that can function as a temporary binder and that will carbonize to leave a network of interconnecting pores. The thermosetting resin, in general, can be any readily available carbonizable thermosetting resin that can be thermally cured, that is easily handled and readily available, and that will carbonize to leave the desired porous structure. Condensation products of formaldehyde with the phenols are satisfactory. Phenol-formaldehyde resins, resorcinol-formaldehyde resins, and other cross-linked or non-fusible resins can be employed.

Sufficient carbonizable solvent for the resin can also be employed to dissolve the resin, to insure that a uniform coating of the resin is formed on the graphite particles. Such solvents may include, for example, water, pine oil, or any other volatile or carbonizable solvent that will serve the purpose, for the particular resin that is used.

The adjuvant that is employed must be one that will not impede, or that will assist in, the formation of a network of interconnecting pores in the shape that is fired to carbonize or volatilize the adjuvant. Pitch and asphalt, for example, are not satisfactory, because they do not permit the formation of an interconnecting network of pores. Cornstarch, dextrin, polyethylene glycol, methyl cellulose, certain waxes, polyvinyl alcohol, lignone, and gum tragacanth are examples of satisfactory adjuvants, that will not interfere with the porous intercommunicating structure.

The selection of silicon or other substance as the carbide-former will be governed by the properties that are desired in the final product. The proportions of the various materials that are employed, to form the mixture from which a shape is made, will be governed by the properties that are desired in this mixture, in the shape that is formed from the mixture, and in the fired body.

In one preferred method for the practice of the invention, a dry mixture of particulate graphite and powdered resin is tumbled for about 30 minutes, in order to insure homogeneity. The graphite in the mixture may be a mixture of not less than about 20% graphite flour that has a particle size on the order of about 74 microns or less, based on the total weight of graphite, together with larger graphite particles. The presence of the graphite flour insures that a shape that is formed from this mixture will have good carbide-forming characteristics.

The dry resinous binder can comprise about 20% by weight of the entire dry mixture, where phenol-formaldehyde resins and the like are employed. A preferred resinous binder can be made by blending together five parts by weight of "Vinsol" resin and four parts by weight of a phenol-formaldehyde resin. "Vinsol" is a trademark of the Hercules Powder Co., of Wilmington, Del., for a thermoplastic resin derived from pinewood and containing phenol, aldehyde, and ether groups.

After the particulate graphite and powdered resin have been thoroughly mixed by tumbling, about 20% by weight, based on the weight of the dry mixture, of pine oil is added. Any other suitable solvent for the resin may be used. Thereafter, to break up any aggregates, the mixture is passed through a coarse screen, such as, for example, a No. 6 screen.

The screened mixture is then pressed at about 1800 p.s.i., to form a shape from the mixture. The mixture can be shaped at pressures in the approximate range from just sufficient to form self-sustaining shapes up to any practical pressure. The shape is dried in an oven at about 150° F. for a period of approximately four hours, to remove volatiles. At the end of the drying period, the temperature is raised to approximately 300° C. for another period of about four hours, to cure the resin and to rigidify the shape.

The shape or specimen is then fired in an inert or reducing atmosphere, in the presence of silicon, at a temperature that is sufficiently high to cause siliconization to occur, and to convert the resultant silicon carbide to the hexagonal crystal form. Siliconization will occur when the silicon is in either molten or vapor form. However, silicon vapors are preferred in order to avoid any erosion that might be caused by molten silicon. For this reason, it is preferred that the shape or specimen be placed upon a porous graphite wick. The silicon is then placed under this wick, so that the silicon must be in the vapor form to penetrate through the wick to siliconize the specimen. The silicon, wick, and specimen are placed in a vessel of some sort, of minimum practical volume, during firing, in order to confine the silicon vapors, to minimize waste.

During firing, the temperature is raised gradually to permit a gradual escape of volatiles from the specimen. The specimen is held at a temperature in the range of about 2150° to 2250° C., based on readings on an optical pyrometer, for a period of about 30 to about 60 minutes. Ordinarily, a considerable excess of silicon is employed, to insure that siliconization is carried as far as practicable, to obtain a body with optimum properties.

The foregoing general process steps are appropriately modified where carbide-formers other than silicon are employed. For example, where tungsten, niobium, and tantalum are employed as the carbide-formers, considerably higher firing temperatures are required.

The following specific examples will serve further to illustrate the exact manner in which the present invention is practiced, and the characteristics of the bodies that are obtained.

EXAMPLE 1

*Graphite bonded by silicon carbide*

An interconnecting alpha silicon carbide matrix was formed by exposing porous, resin-bonded graphite shapes to silicon vapors at an elevated temperature. Several specimens were prepared.

To prepare the specimens, graphite particles, −10 +35 mesh, were mixed with −200 mesh graphite flour, in the ratio of 55 parts by weight of the coarse particles to 45 parts by weight of the flour. The mesh sizes referred to here, and throughout this description, are on the Tyler standard screen scale. A mixture of four parts of a dry powdered phenol-formaldehyde resin and five parts of "Vinsol" resin was thoroughly mixed with the graphite, in the amount of about 20% by weight of the mixture, based on the weight of the graphite.

After the dry ingredients were thoroughly mixed, about 20% by weight, based on the dry mixture, of pine oil was blended with the mixture to dissolve the resin. The mixture was then molded at a pressure of about 1800 p.s.i., to form several specimen discs that had a diameter of one inch and that were three-quarters of an inch thick.

These specimens were dried in an oven at 80° C. for ten hours, and then were baked at 150° C. for an additional period of ten hours, to polymerize the resin. After the resin had been cured, the specimens could be handled safely, and could be stored if necessary, without danger of any substantial change occurring.

In the present case, after curing the resin, the specimens were placed directly in a graphite crucible, and finely divided silicon metal, −30 +80 mesh, was poured into the crucible around the specimens. The crucible was then placed in an induction furnace, and was heated to about 2150° C., and held there for 30 minutes. Argon gas was introduced into the furnace during firing to prevent oxidation.

The apparent densities of the specimens that were prepared by the above procedure fell in the range from 1.8 to 2.0 g./cc.

A simple screening test was conducted to determine oxidation resistance of these specimens. An oxy-acetylene torch was directed at various specimens for two minutes. A maximum surface temperature of 1650° C. was reached during the two minute period. A fine-grained graphite sample was used as a control. The graphite sample had a weight loss that was 50% greater than the weight loss of any of the tested specimens. The only apparent damage to any of the silicon carbide-bonded graphite samples was a small amount of oxidation of graphite particles that occurred in localized areas. The silicon carbide was unaffected by the attack.

Microscopic examination indicated that a continuous bonding phase of alpha silicon carbide was obtained. The crystal growth of the alpha form was quite evident.

A typical specimen was polished and a surface study was made. The specimen was composed of relatively large and distinct graphitic masses (phenocrysts) embedded in a matrix of silicon carbide that was very well crystallized. The silicon carbide contributed considerable strength to the entire specimen, and was easily finely ground for surface study. The graphitic phenocrysts showed some low relief in contrast to the silicon carbide.

The graphitic phenocrysts exhibited irregular outlines in addition to being angular to sub-rounded and/or tabular. Some of the phenocrysts were approximately equi-dimensional. The graphitic phenocrysts ranged in size from 0.12 mm. up to approximately 2.0 mm.; the predominant size was between 0.73 mm. and 1.81 mm. Minute graphitic masses, commonly several microns in diameter, occurred within the silicon carbide matrix, especially in the widest portions of the matrix.

The silicon carbide matrix varied in width from several microns up to 0.48 mm.; the average width was between 0.24 and 0.36 mm. The silicon carbide was well crystallized, that is, the crystals were well developed, and continuous, and imparted considerable strength to the sample. Small silicon carbide inclusions also occurred within some of the graphitic phenocrysts.

EXAMPLE 2

To obtain information on the strength characteristics of these bodies, other specimens were prepared, following the procedures described above in Example 1, and according to the specifications outlined in ASTM test No. D651-42T.

To demonstrate the effect of particle size of the graphite on the bonded bodies that are obtained, different weight ratios of coarse particles of graphite to fine particles were employed in preparing these additional specimens.

These specimens were then evaluated for room temperature tensile strength in a 5000 lb. Tinius-Olsen tensile machine. The specimens were compared with graphite control specimens. The results are tabulated in the following table.

TABLE 1.—TENSILE STRENGTH TEST RESULTS

| | Number of samples tested | Average breaking strength p.s.i. | Standard deviation p.s.i. | Coefficient of variation |
|---|---|---|---|---|
| Graphite, ratio of coarse to fine: | | | | |
| 60/40 | 4 | 1,490 | 469 | 31.4 |
| 75/25 | 5 | 2,502 | 167 | 6.7 |
| 80/20 | 5 | 2,196 | 202 | 9.2 |
| Graphite control: Graphite (standard graphite, National Carbon Co. AGR) | 4 | 575 | 66 | 11.5 |

After the specimens have been evaluated for room temperature tensile strength, their chemical compositions and average densities were determined. This data is tabulated below in Table 2.

TABLE 2.—CHEMICAL COMPOSITION OF SPECIMENS

| | Average fired density gm./cc. | Percent free carbon | Percent free silicon | Percent $SiO_2$ | Percent SiC |
|---|---|---|---|---|---|
| Graphite particles (coarse to fine ratio): | | | | | |
| 60/40 | 1.92 | 65.58 | .96 | .25 | 31.63 |
| 75/25 | 2.03 | 43.66 | 2.30 | .82 | 52.36 |
| 80/20 | 1.86 | 45.48 | 3.30 | .94 | 49.45 |

The impregnated bodies were obviously far superior to the graphite body that was tested as a control.

From the data in Table 2, it appears that as the proportion of fine particles of graphite in the graphite mix is decreased, the content of free silicon in the fired body increases. It is also apparent that the carbon that is formed by carbonization of the resin bond, as well as the major portion of the fine graphite particles, are converted to silicon carbide.

Micrometric measurements of the samples indicated no apparent dimensional changes during firing, except for isolated cases where erosion occurred. This erosion was caused by direct contact of molten silicon in the crucible with the specimens. The erosion may have been caused by solution of silicon carbide in the molten silicon, or by a washing effect of the molten silicon. This erosion can be eliminated by placing the shapes on a support so that they are not directly exposed to the molten metal.

Because there is no volume change caused by carbide formation, the graphitic mass can be machined in any desired shape before firing, to close dimensional tolerances and the fired body will retain this shape.

EXAMPLE 3

Rupture tests

Again following the procedures described in Example 1, several additional graphite-based specimens were prepared. These specimens were prepared in the form of bars that had the dimensions ¼" by ½" by 3". One group of specimens was prepared that had a coarse to fine graphite particle ratio of 80 to 20; and a second group of specimens was prepared that had a coarse to fine ratio of 70 to 30. A number of the specimens in each group were refired at 2150° C. to volatilize excess silicon.

These test bars were evaluated for transverse rupture strengths at 1500° C. in an argon atmosphere. To make this evaluation, the specimens were broken using a single point loading method. The results of the transverse rupture tests are tabulated in Table 3.

TABLE 3.—RESULTS OF TRANSVERSE RUPTURE TESTS

| | Number of samples | Average rupture strength p.s.i. | Standard deviation p.s.i. | Percent coefficient of variation | Range |
|---|---|---|---|---|---|
| Graphite coarse to fine particle ratio: | | | | | |
| 70/30 | 8 | 7,000 | 1,200 | 17.5 | 5,200–8,900 |
| 70/30 (refired to 2150° C.) | 8 | 7,400 | 880 | 11.9 | 5,900–8,700 |
| 80/20 | 8 | 7,100 | 940 | 13.1 | 6,200–8,500 |
| 80/20 (refired to 2150° C.) | 8 | 6,700 | 340 | 5.1 | 6,200–7,200 |
| Graphite control: | | | | | |
| Impregnated graphite [1] | 10 | 5,400 | 530 | 9.8 | 4,900–6,200 |
| Graphite [2] | 10 | 1,500 | 150 | 10.1 | 1,200–1,700 |

[1] Molded graphite, National Carbon Co. ATJ, impregnated after molding for applications involving high temperatures and requiring high strength.
[2] Standard graphite, National Carbon Co. AGR.

The results of these tests indicate that the specimens have greater transverse rupture strengths than either of the types of graphite that were employed as controls, when tested at 1500° C. in an argon atmosphere.

EXAMPLE 4

*Dynamic high temperature tests*

Again following the procedure described in Example 1, several test specimens were prepared in the shape of cylinders that had diameters of ½ inch, with their ends curved on a ¼ inch radius. These specimens were cemented into a metal holder with a refractory cement.

The conditions that are desired for high temperature tests are that the test specimen be simultaneously subjected to reproducible conditions involving high velocity air flow and high temperatures. To attain these conditions, a special test apparatus was constructed. This apparatus employed a high current carbon arc as a source of heat. Air was blown through the arc flame at a high velocity to create a "tail" that streamed out from the arc flame and that produced the required conditions of high velocity air flow and high temperature.

The test specimens were placed at a distance of approximately ½ inch from the arc, and were subjected to the arc tail flame and moderate air flows for periods of up to 1 minute. Graphite control cylinders of the same dimensions were prepared for control purposes, and were tested in the same way.

TABLE 4.—RESULTS OF ARC TEST

| | Apparent temperature (° C.) | Time of test, sec. | Percent weight change | Remarks |
|---|---|---|---|---|
| Graphite coarse to fine particle ratio: | | | | |
| 80C/20F | 1,880 | 60 | +.68 | Silicon on surfaces. |
| 70C/30F | 2,150 | 60 | 0 | No apparent attack. |
| Graphite (National Carbon Co. ATJ) | 2,000 | 60 | −3.48 | Oxidized, eroded. |

The different characteristics of the graphite cylinder and the carbide-bonded cylinders are evident from Table 4. It was not possible to differentiate between the two carbide-bonded specimens by visual inspection. Both carbide-bonded specimens were markedly superior to the graphite control cylinder with respect to oxidation loss.

A further test was conducted on a cylinder that was made from 80C/20F carbide-bonded graphite. This cylinder was placed approximately ⅜ of an inch from the arc and was tested for a period of two minutes, with a resulting weight loss of only 0.04 gr. The apparent temperature on the cylinder was in excess of 2400° C. This compares very favorably with the graphite cylinder, which had a weight loss of 0.87 gr. after a test period of 1 minute. The graphite cylinder had been held ½ inch from the arc and attained an apparent temperature of only 2000° C.

Visual observation of the samples that were subjected to the arc test indicated that the actual temperatures to which the cylinders were subjected were far greater than the values obtained by readings taken on an optical pyrometer, and mentioned above.

EXAMPLE 5

*Bonding by silicon carbide of preformed porous graphite bodies*

Graphite bodies of controlled porosity are commercially available. These graphite bodies can be purchased at predetermined average porosities and bulk densities. These bodies were carbide-bonded in the following manner.

Porous graphite bodies were obtained that had an average porosity of 48% and a bulk density of approximately 1.04 g./cc. Several such bodies were obtained, each body having different pore diameters. The pore diameters of the different respective bodies ranged in size from 140 microns to 33 microns. The bodies were cut into bars that had the dimensions ¼" by ½" by 3".

Following the procedure described in Example 1, these graphite bodies were fired in the presence of silicon, and then were refired to a temperature of about 2150° C. to volatilize any excess silicon.

These bars were then broken in transverse rupture tests at 1500° C. in an argon atmosphere. The impregnated bodies were considerably stronger than the original carbon bodies. The results of the transverse rupture tests are tabulated below.

TABLE 5.—TRANSVERSE RUPTURE STRENGTH RESULTS AT 1500° C.

| | Number of samples | Average rupture strength p.s.i. | Standard deviation p.s.i. | Percent efficient of co-variation | Range |
|---|---|---|---|---|---|
| Bonded with carbide: | | | | | |
| Nat. Carbon P.G. 20 [1] | 8 | 3,700 | 550 | 14.7 | 3,000–4,600 |
| Nat. Carbon P.G. 40 | 8 | 4,500 | 480 | 10.6 | 3,900–5,600 |
| Nat. Carbon P.G. 50 | 8 | 5,900 | 720 | 12.2 | 4,400–7,000 |
| Nat. Carbon P.G. 60 | 8 | 8,800 | 970 | 11.1 | 7,000–10,000 |
| Graphite control: | | | | | |
| National Carbon Co. ATJ | 10 | 5,400 | 530 | 9.8 | 4,900–6,200 |
| National Carbon Co. AGR | 10 | 1,500 | 150 | 10.1 | 1,200–1,700 |

[1] The expression "Nat. Carbon P.G.", followed by a numeral, is employed to identify porous graphite that is supplied by the National Carbon Company. The numerals are grade indicia. For example, the P.G. 20 series of porous graphite bodies has an average pore diameter of approximately 140 microns, whereas the P.G. 60 series has a pore diameter of about 33 microns.

This demonstrates that preformed porous graphite can be successfully encapsulated in a silicon carbide matrix. However, preformed porous graphite bodies are difficult to produce and are not currently commercially available in large sizes. For this reason the use of preformed porous graphite bodies as a starting material for the formation of silicon carbide-bonded graphite bodies is not as flexible as the use of graphitic particles.

EXAMPLE 6

Effects of graphite particle size

For many high temperature applications, it is desirable that a very smooth surface finish be obtained. To evaluate the effects of increasing the proportions of fine to coarse particles of graphite in the graphite mixture, several additional specimens were prepared in which the coarse to fine particle ratios fell in the ranges of from about 30 weight percent coarse to 70 fine, up to 60 weight percent coarse to 40 percent fine.

These specimens were prepared in a manner similar to that described in Example 1. The test specimens were prepared either in the shape of bars that had the dimensions ¼" by ½" by 3" for a transverse rupture test, or as tensile test specimens having the dimensions specified in ASTM test No. D651-42T.

The transverse rupture strengths and tensile strengths were compared to graphite controls, and the results are tabulated in the following two tables, respectively.

TABLE 6.—TRANSVERSE RUPTURE STRENGTHS AT 1,500° C.

| | Number of samples | Average density g./cc. | Average rupture strength p.s.i. | Standard deviation p.s.i. | Percent coefficient of variation | Range |
|---|---|---|---|---|---|---|
| Percent graphite coarse to fine particle ratio: | | | | | | |
| 60/40 | 6 | 2.56 | 9,100 | 963 | 10.6 | 7,500–10,700 |
| 50/50 | 6 | 2.60 | 10,650 | 1,289 | 12.1 | 8,700–12,500 |
| 40/60 | 6 | 2.74 | 11,650 | 966 | 8.3 | 10,100–12,700 |
| 30/70 | 6 | 2.75 | 12,100 | 1,201 | 9.9 | 9,600–13,500 |

TABLE 7.—TENSILE TEST RESULTS AT ROOM TEMPERATURE

| | Number of samples | Average density g./cc. | Average breaking strength p.s.i. | Range |
|---|---|---|---|---|
| Coarse to fine particle ratio: | | | | |
| 60/40 | 6 | 2.33 | 3,520 | 2,990–4,130 |
| 50/50 | 6 | 2.43 | 3,200 | 2,950–3,650 |
| 40/60 | 6 | 2.64 | 3,600 | 3,140–4,120 |
| 30/70 [1] | 6 | 2.73 | 3,170 | 2,600–4,300 |
| Graphite controls: | | | | |
| National Carbon Co. AGR graphite | 4 | | 575 | |
| National Carbon Co. ATJ graphite | 4 | | 1,792 | |

[1] Considerable erosion occurred during the impregnation which may have affected the results for the specimens having a 30/70 ratio.

Visual inspection of the specimens indicated that a very good surface finish could be obtained from graphite mixtures that contained at least 50% by weight of fine particles to coarse particles. The "coarse" particles were predominantly in the range from about 200 microns to about 2.4 mm. The results of the strength tests indicate that the strength of the silicon carbide-impregnated graphite materials increases as the ratio of graphite fines in the batch is increased. This is probably attributable to the fact that the amount of silicon carbide in the fired body increases somewhat in proportion to the amount of fines in the batch. It is noted that the density of the specimens is increased for the higher ratios of fine graphite particles. The surface finish improved as the strength increased, indicating that bodies that are prepared from graphite batches that have a high proportion of fines will be eminently suitable for high temperature applications where fine surface finishes are important.

Test specimens of these bodies were also evaluated by dynamic high temperature tests. For the purpose of making these tests, the specimens were shaped into ½" diameter cylinders that were curved at their ends on a ¼" radius. The specimens were cemented into a metal holder with a refractory cement.

The test specimens were then placed at a distance of about ½" from a high temperature arc, and were subjected to the arc tail flame and moderate air flows for periods up to one minute, in the same manner that previous dynamic high temperature tests were made. The results of the tests are summarized in the following table.

TABLE 8.—RESULTS OF DYNAMIC HIGH TEMPERATURE TESTS

| | Density | Time of test, sec. | Apparent temperature (° C.) | Percent weight change |
|---|---|---|---|---|
| Percent graphite coarse to fine particle ratio: | | | | |
| 60/40: | | | | |
| Spec. 1 | 2.32 | 60 | >2,840 | 2.59 |
| Spec. 2 | 2.58 | 60 | 2,500 | 1.60 |
| 50/50: | | | | |
| Spec. 1 | 2.73 | 60 | 2,600 | 0.91 |
| Spec. 2 | 2.70 | 60 | >2,600 | 2.71 |
| 40/60: | | | | |
| Spec. 1 | 2.77 | 60 | 2,600 | 1.90 |
| Spec. 2 | 2.74 | 60 | 2,380 | 0.64 |
| 30/70: | | | | |
| Spec. 1 | 2.81 | 60 | 2,250 | 0.11 |
| Spec. 2 | 2.86 | 60 | 2,400 | 0.71 |
| National Carbon Co. ATJ graphite: | | | | |
| Spec. 1 | | 60 | >2,800 | 7.20 |
| Spec. 2 | | 60 | 2,350 | 5.70 |

The results of the high temperature tests indicate that the performance of the graphite bodies that are bonded with silicon carbide is very superior. The majority of the bodies withstood apparent temperatures that were in excess of 2500° C. The percent weight change was very favorable in comparison with the graphite control.

EXAMPLE 7

Further to demonstrate the invention, several additional groups of specimens were prepared, following the procedures that were described in Example 1. The proportions of coarse particles to fine particles differed in each group, as indicated.

MIX PROPORTIONS FOR SILICON CARBIDE-BONDED BODIES

| Dry mix proportions, weight percent | | Mix additions based on weight dry mix | | Weight addition [1] for Siliconizing Based on Cured Specimen Wt. Percent −30 +80 Mesh Si |
|---|---|---|---|---|
| Coarse graphite | Fine graphite | Weight percent bond [2] | Weight percent pine oil | |
| 30 | 70 | 20 | 20 | 70–120 |
| 50 | 50 | 20 | 20 | 60–100 |
| 80 | 20 | 20 | 20 | 25– 65 |

[1] Actual weight gain by siliconizing. An excess amount of silicon is employed over and above the actual weight gain. The amount of excess silicon that is employed is influenced by the volume of the container. Thus, when fired in containers of equal volume, large bodies usually require a smaller excess of silicon than do smaller bodies.
[2] The bond was a mixture of five parts of "Vinsol" resin and four parts of phenol-formaldehyde resin, both in powdered form.

The fine graphite had a particle size of about 74 microns and less; that is, it had a distribution of approximately 99% through a 200 mesh Tyler standard screen. The coarse graphite had the following distribution:

| On 8 | On 10 | On 20 | On 35 | On 65 |
|---|---|---|---|---|
| 5% | 21% | 58% | 13% | 2% |

The properties of the specimens prepared are summarized in the following table.

TABLE 9

| Mixture | Avg. mod. rupture p.s.i. | Avg. tensile p.s.i. | Fired dens g./cc. | Weight loss oxid. test percent | SiC percent | Free C percent | Free Si percent |
|---|---|---|---|---|---|---|---|
| 30C/70F | 12,108 | 3,530 | 2.75 | 5.0 | 77.2 | 20.0 | 0.9 |
| 50C/50F | 10,654 | 3,240 | 2.55 | ---- | 74.8 | 22.7 | 0.5 |
| 80C/20F | 6,700 | 2,200 | 2.3 | 33.5 | 49.5 | 45.5 | 3.3 |

In Table 9, the weight loss was determined by an oxidation test in which the specimens were heated in air for 31 hours at a temperature of about 1400° C. The weight losses of the specimens, as determined at periodic intervals during the tests, are summarized below in Table 10.

TABLE 10.—PERCENT WT. LOSS AT 1400° C. IN AIR

| Hrs. | 30C/70F | 50C/50F | 80C/20F | High density graphite (National Carbon Co. ATJ) |
|---|---|---|---|---|
| 0.5 | .5 | 1.7 | 2.2 | 42.5 |
| 1 | 1.0 | 3.0 | 3.8 | ---- |
| 3 | 2.0 | 6.2 | 8.2 | ---- |
| 5 | 2.5 | 8.5 | 11.5 | ---- |
| 10 | 3.5 | ---- | 12.7 | ---- |
| 15 | 4.0 | ---- | 23.2 | ---- |
| 20 | 4.5 | ---- | 28.0 | ---- |
| 25 | 4.8 | ---- | 31.5 | ---- |
| 28 | 5.0 | ---- | 33.5 | ---- |

The foregoing demonstrations prove conclusively that the silicon carbide-bonded graphite bodies are decidedly superior in strength characteristics, and in their resistance to oxidation, to high density graphite bodies.

EXAMPLE 8

*Zirconium carbide-bonded graphite bodies*

The procedure described in Example 1 was followed for the preparation of zirconium carbide-bonded graphite bodies, except that zirconium metal was substituted for silicon metal, and the firing temperature was in the range of 2400° C. to 2500° C. Bonded graphite bodies were obtained that had strength characteristics, and abrasion and erosion resistance, that were decidedly superior to those of high density graphite bodies.

In the same way, the carbides of the other materials mentioned above as carbide-formers, can be employed to bond graphite bodies, to provide superior erosion and abrasion resistance, and improved strength characteristics.

From the foregoing examples and general description, it will be obvious that many variations may be made in the process that are within the scope of this invention. For example, in preparing the graphitic mixture that is to be formed into a shape, graphitic carbon in fine particle form may be substituted for some or all of the fine graphite. The term "graphite carbon" is used herein to refer to carbon that can be converted to graphite by thermal treatment. Typical forms of carbon that could be substituted for graphite, in the manner mentioned above, are lamp black and anthracite. Ordinarily, it is preferred that fine graphite be employed, in order that the excellent thermal stability property of graphite may be imparted to the body that is obtained. In order that the thermal stability of the body be in a desirable range, the graphite content of the body should be at least about 10%, by weight, and usually the graphite content will be higher than 10%, as shown in the foregoing examples.

Similarly, the dry mix ingredients that are to be formed into a shape can be mixed with one of the vegetable gums, such as, for example, gum tragacanth. Many of these gums can be used as temporary binders, and are particularly desirable where the shape is to be formed by cold extrusion. Any gum can be used for this purpose that will carbonize and that will provide, or will not interfere with, an intercommunicating porous structure in the shape.

When the shape is siliconized, it is essential that enough free silicon be available to react with all of the carbon that will siliconize. Where phenol-formaldehyde condensation products are employed to form the bond, usually their carbon content is on the order of 40% to about 50% of their total weight. During firing, the resins are carbonized to leave a fine carbon residue that siliconizes readily. For purposes of computing the minimum amount of silicon that must be employed, to be safe it should be assumed that 100% of the carbon from the resin will be converted to carbide; and that 100% of the fine graphite will be converted to carbide. This later assumption is of course not true for graphite mixes that contain a very high proportion of fine graphite. In addition, an allowance must be made to compensate for the empty volume of the container in which the shape is siliconized. For a container with a minimum amount of unoccupied volume, the figure for silicon that has already been obtained should be increased by a factor of one-half. For larger containers the excess of silicon should be correspondingly increased. Similar considerations apply where other carbide-formers are used.

The particular carbide that is to form the bond must be stable, must wet the graphite particles, and must be capable of forming a substantially continuous matrix that will encapsulate the graphite particles. Silicon carbide fulfills these requirements admirably. Silicon carbide forms a continuous matrix that appears on the surface of the graphite as well as within the body, and that forms a surface coating or glaze that functions as a barrier that prevents contact between air and graphite.

In forming a silicon carbide matrix, the firing schedule can be very flexible, but it is preferred that a temperature of about 2200° C. be employed and maintained for approximately an hour or somewhat longer, to permit recrystallization to occur so that the silicon carbide is in the alpha form.

The size of the carbide-bonded bodies that can be produced appears to be without limit. However, it is essential that the shape, from which a body is formed, contain an intercommunicating network of pores, to permit penetration by the silicon or other carbide-former. Except for this limitation, bodies can be formed that have any desired size and shape.

At the present time, it appears to be essential that the carbide be formed by penetration from without the body of the carbide-former, in molten or vapor form. For example, an attempt was made to form a carbide-bonded body from a mixture of 60 parts by weight of fine graphite, 40 parts by weight of —20 mesh silicon, 20 parts by weight of a mixture of four parts of phenolformaldehyde resin powder with five parts of "Vinsol" resin, as a binder, and 30 parts by weight of pine oil. This mixture was pressed at 1800 p.s.i., oven-cured, and fired in argon.

Three groups of specimens were prepared in this manner. The first group was fired at 1800° C. for five minutes; the second group was fired to 2150° C. and held there for one hour; and the third group was fired to 1400° C. and held there for one hour and a half. Specimens from the first two groups had a modulus of rupture that was less than 250 p.s.i. The modulus of rupture for two specimens in the third group was 792 p.s.i. and 699 p.s.i., respectively. All of the specimens were weak structurally and could not be polished or finely ground for surface study. The specimens from the second group were composed of very fine-grained silicon carbide and graphite, intimately mixed, and orientation was not evident. Because of the soft characteristics of the material, the specimen surface, in addition to being very rough, presented excessive negative relief in a transparent mount of methylmethacrylate.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A homogeneous, carbide-bonded graphitic body consisting essentially of discrete graphitic masses embedded in a substantially homogeneous matrix of a stable carbide, said body containing an amount of uncombined carbide-former less than about 3.3% by weight of the body.

2. A homogeneous, silicon carbide-bonded graphitic body consisting essentially of discrete graphitic masses embedded in a substantially homogeneous matrix of crystallized silicon carbide, said body containing an amount of free silicon less than about 3.3% by weight of the body.

3. A homogeneous, zirconium carbide-bonded graphitic body consisting essentially of discrete graphitic masses embedded in a substantially homogeneous matrix of crystalline zirconium carbide, said body containing an amount of free zirconium less than about 3.3% by weight of the body.

4. A homogeneous, carbide-bonded graphitic body consisting essentially of graphitic phenocrysts embedded in a substantially homogeneous matrix of a stable crystallized carbide, said phenocrysts exhibiting irregular outlines and being predominantly below about 2.0 mm. in their largest dimension, said body containing an amount of uncombined carbide-former less than about 3.3% by weight of the body.

5. A homogeneous, silicon carbide-bonded graphitic body consisting essentially of graphitic phenocrysts embedded in a matrix of crystalline alpha silicon carbide, said phenocrysts exhibiting irregular outlines and having their largest dimension predominantly in the range between about 0.73 mm. and 1.81 mm., said silicon carbide exhibiting excellent articulation and being disposed in a continuous network, said body containing an amount of free silicon less than about 3.3% by weight of the body.

References Cited in the file of this patent

UNITED STATES PATENTS

| | | |
|---|---|---|
| 1,714,165 | Gilbert | May 21, 1929 |
| 2,215,572 | Wilson | Sept. 24, 1940 |
| 2,222,188 | White | Nov. 19, 1940 |
| 2,286,672 | Lamatter | June 16, 1942 |
| 2,548,897 | Kroll | Apr. 17, 1951 |
| 2,799,912 | Greger | July 23, 1957 |

FOREIGN PATENTS

| | | |
|---|---|---|
| 713,710 | Great Britain | Aug. 18, 1954 |